April 7, 1970  KENZO OKABE  3,504,574
PLANET-BALL TYPE, STEPLESS SPEED-CHANGING DEVICE
Filed May 8, 1968  2 Sheets-Sheet 1
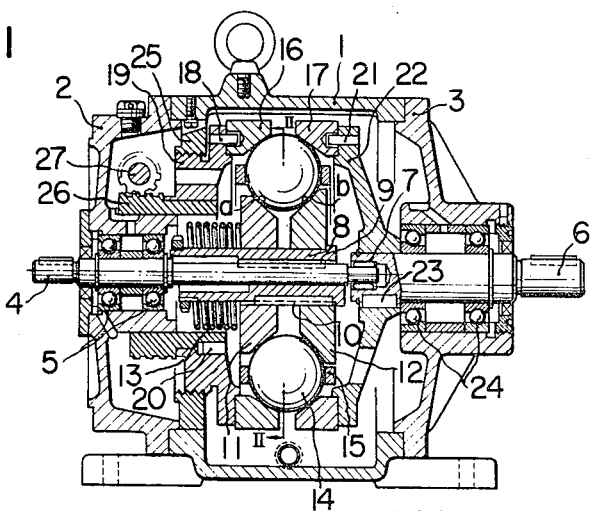
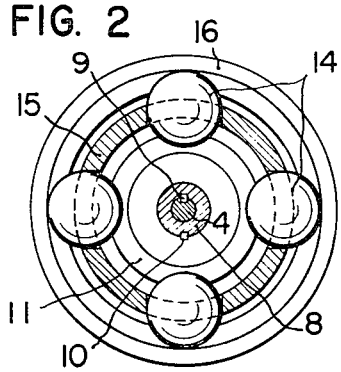
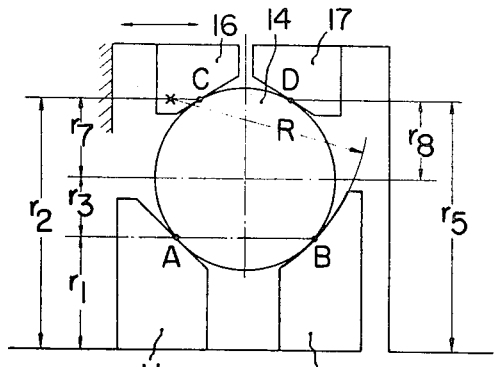
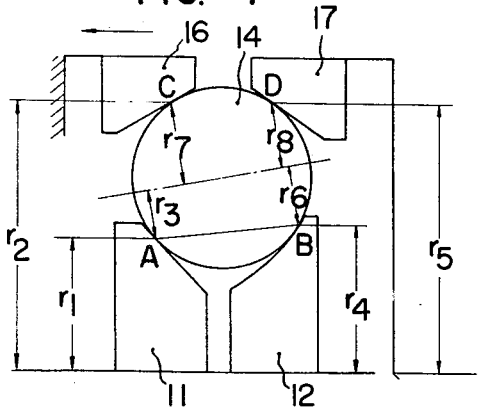
INVENTOR.
K. OKABE
BY Blascoe, Downing & Seebold
ATTORNEYS.

United States Patent Office 3,504,574
Patented Apr. 7, 1970

3,504,574
PLANET-BALL TYPE, STEPLESS SPEED-CHANGING DEVICE
Kenzo Okabe, Nagoya-shi, Japan, assignor to Asahi Seiki Kogyo Kabushiki Kaisha, Asahi-machi, Higashikasugai-gun, Aichi-ken, Japan
Filed May 8, 1968, Ser. No. 727,582
Claims priority, application Japan, Oct. 3, 1967, 42/63,318
Int. Cl. F16h 15/50
U.S. Cl. 74—796   3 Claims

ABSTRACT OF THE DISCLOSURE

Planet balls lying in a common orbit and clamped between four beveled contact surfaces of two sun rollers rotating with an input shaft of a first outer ring, and of a differential outer ring coupled to an output shaft are caused by rotation of the input shaft to undergo planetary power transmission operation with respective virtual axes of gyration, one of the contact surfaces being formed by a concave arcuate generatrix. The first outer ring is adjustably movable in the axial direction to cause variation in the orientation of the virtual axes of gyration of the planet balls and thereby to vary the speed ratio between the input and output shafts.

BACKGROUND OF THE INVENTION

This invention relates generally to the field of speed-changing devices and more particularly to a new ultra-low-speed, stepless speed-changing device in which planet balls or spheres are used.

Heretofore, in order to obtain ultra-slow speeds in a stepless or infinitely variable speed changer, it has been the common practice to add one or more further speed-reducing mechanisms, which practice is uneconomical. Furthermore, in some stepless speed changers of planet-ball type known heretofore, each of the planet balls is provided with a central hole, and the output speed is changed by tilting the axis of gyration of each of the balls by means of a very complicated mechanism.

Another disadvantageous feature of almost all known stepless speed-changing devices is that excessive thrust in axial directions are produced and give rise to overheating of bearing leading to seizure thereof in many cases and extremely high power loss. A further disadvantageous feature of many known stepless speed-changing mechanisms is that their speed-change ratios cannot be varied unless the mechanisms are in operation.

SUMMARY OF THE INVENTION

It is an object of the present invention to overcome the above described difficulties accompanying known stepless speed-changing devices.

More specifically, an object of the invention is to provide an ultra-low-speed, stepless speed changing device of planet ball type of very simple construction in which not only ultra-low speeds can be obtained without the use of additional speed-reducing mechanisms, but the variation of the speed-change ratio can be accomplished in an extremely easy manner.

Another specific object of the invention is to provide a speed-changing device of the above stated character in which the planetary balls do not have central holes, but high speed-reduction ratios are stepless attained by causing variations in the orientations of the virtual axes of gyration of the planet balls through movements of a first outer ring in the axial direction.

Still another specific object of the invention is to overcome the aforementioned problem of excessive thrust force by providing, in the speed-changing device, means whereby the thrust force between two mutually facing sun rollers is prevented from affecting parts outside thereof, only a slight thrust produced between the planet balls and the differential outer ring being applied to an output shaft bearing, and a high efficiency is thereby attained.

A further object of the invention is to overcome the aforementioned problem of varying the speed-change ratio during standstill by providing, in the speed-changing device, a first outer ring and a speed ratio varying ring interlinked together by means such as pins, the first outer ring being adjustably moved in the axial direction by the control actuation of means such as a screw, whereby the speed ratio can be readily and conveniently varied even when the device is in inoperative state.

According to the present invention, briefly summarized, there is provided a stepless speed-changing device of planet ball type having input and output shafts and characterised by the combination therein of two sun rollers coaxially mounted on and keyed to a hollow shaft slidably in the axial direction, the hollow shaft being slidably fitted on the input shaft by a key, and two outer rings coaxial with the input shaft. The first outer ring being rotatable and adjustably movable in the axial direction, and the other being differential and coupled to the output shaft. A single group of planet balls arranged at their inner sides between mutually opposed and beveled outer ball-contact surfaces of two sun rollers, and at the outer sides between mutually opposed and beveled inner ball-contact surfaces, one of the ball-contact surfaces being formed by a concave arcuate generatrix. A device for applying constant force urging one sun roller toward the other, and a device to move the first outer ring in the axial direction to vary the inclination angle of the virtual axes of gyration of the planet balls relative to the input shaft axis and thereby to accomplish stepless variation of the speed-change ratio between the input and output shafts.

The nature, principle, details, and utility of the invention will be more clearly apparent from the following detailed description with respect to a preferred embodiment of the invention when read in conjunction with the accompanying drawing, in which like parts are designated by like reference numerals and characters.

BRIEF DESCRIPTION OF THE DRAWING

In the drawing:
FIG. 1 is a side elevational view, in vertical section, showing the general organisation of one example of a speed-changing device embodying the invention;
FIG. 2 is a cross-sectional view taken in the plane indicated by line II—II in FIG. 1 in the indicated arrow direction;
FIGS. 3 and 4 are graphical explanatory diagrams for calculation of speed ratios and output rotational speeds of the speed-changing device shown in FIGS. 1 and 2.

In FIG. 1, two operational states, as described hereinafter, of certain axially movable parts are shown respectively above and below the centreline of the input shaft 4.

DETAILED DESCRIPTION

Figure 5:
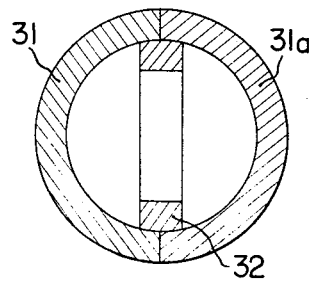
FIGS. 5 through 8 are sectional views showing examples of construction of hollow planet balls suitable for use in the speed-changing device of the invention.
Figure 6:
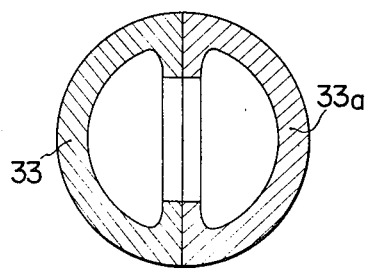
Figure 7:
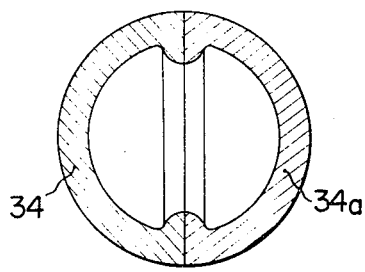
Figure 8:
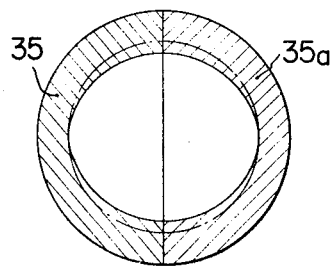

Referring first to FIGS. 1 and 2, the speed-changing device shown therein has an outer casing made up of a frame 1 and input and output end covers 2 and 3 fixed to opposite ends of the frame 1. An input shaft 4 is rotatably supported near its outer end by bearings 5, 5 installed in the central part of the end cover 2 and at its inner end by a needle-roller bearing 7 provided in a recess in the inner end of an output shaft 6 coaxially alined with the input shaft 4 and rotatably supported by bearings 24, 24 installed in the central part of the end cover 3.

A hollow shaft 8 is slidably fitted around the middle part of the input shaft 4 and is slidable relative thereto in the axial direction but is prevented from rotating relative thereto by a longitudinal key 9. The hollow shaft 8 supports two sun rollers 11 and 12 fitted there-around and respectively have beveled ball-contact surfaces $a$ and $b$ which are mutually opposed and clamp therebetween a plurality of planet balls 14, 14. Two sun rollers 11 and 12 are arranged on the hollow shaft 8 so that they may have relative axial movement, but be prevented from rotation relative to the hollow shaft 8 by a key 10.

A compression spring 13 coaxially disposed with respect to the hollow shaft 8 is interposed between a flange fixed to the end of the hollow shaft 8 nearest the input side and the back surface of the sun roller 11, which is thereby pressed constantly toward the sun roller 12. Consequently, the two sun rollers 11 and 12 and the planet balls 14, 14 are in a state of frictional engagement. The drive surface $a$ of the sun roller 11 is of truncate-conical shape, while the generatrix of the drive surface $b$ of the sun roller 12 is not a straight line but a concave arc of a circle of greater radius than each planet ball 14, as described more fully hereinafter.

The planet balls 14, 14 are retained with equal spacing in a common circular orbit coaxial with the input shaft centreline by retainers 15 and are in frictional engagement also with truncate-conical, mutually-opposed contact surfaces respectively of a first outer ring 16 and a differential outer ring 17, which are provided around and clamp therebetween the outer portions of the assembled planet balls.

The first outer ring 16 is coupled on its side facing the input side coaxially to a flange of a ratio varying ring 19 by pins 18. This ring 19 is provided on an outer cylindrical part thereof with external screw threads engaged with internal screw threads provided on the inner surface of a frame ring 25 fixed to the inner side of the frame 1. Furthermore, the ratio varying ring 19 is supported on and fixed by pins 20 to the boss of a helical gear 26 engaged with a worm 27 fixed to a shaft which is rotatable from the outside.

Accordingly, when worm 27 is thus rotated, gear 26 is rotated to rotate ratio varying ring 19, which thereby moves in the axial direction because of its screw engagement with fixed frame ring 25. Consequently, first outer ring 16 is also moved axially as it rotates.

On the output side, the differential outer ring 17 is coupled coaxially by way of pins 21 to a support disk 22 keyed by a key 23 to the inner end of the output shaft 6.

The speed-changing device of the above described organization according to the invention operates in the following manner.

When the input shaft 4 is rotated by some motive power means (not shown), its rotation is transmitted through key 9, hollow shaft 8, and key 10 to cause rotation of sun rollers 11 and 12, ball-contact surfaces $a$ and $b$ of which thereupon drive planet balls 14, 14. Consequently, planet balls 14, 14, revolve (roll) along the inner surface of first outer ring 16 as they gyrate about their own virtual axes.

Each of these virtual axes is a line passing through the centre of the corresponding planet ball 14 and through a point P (not shown) on the centreline of the input shaft 4 where a line passing through the points of contact of that ball 14 with the sun rollers 11 and 12 intersects the centreline of the input shaft 4.

On the output side, differential outer ring 17 rotates with a peripheral speed at its point of contact with each planet ball 14 equal to the difference between the peripheral speeds of gyration and revolution of balls 14, 14. This rotation of differential outer ring 17 is transmitted through support disk 22 to output shaft 6, which thereby rotates at an ultra-low speed.

In this speed-changing device, when worm 27 is rotated in one direction, helical gear 26, ratio varying ring 19, and first outer ring 16 are rotated and, at the same time, move axially, as described hereinbefore, toward differential outer ring 17, whereby the truncate-conical drive surface $a$ of first outer ring 16 presses planet balls 14, 14 toward the right as viewed in FIG. 1.

Accordingly, each planet ball 14 moves along the conical drive surface of differential outer ring 17 in a direction toward the right and toward the centreline of output shaft 6. Consequently, sun roller 12 is pressed toward the right, while sun roller 11 moves leftward relative to sun roller against the force of spring 13.

The contact points between each ball 14 and sun rollers 11 and 12 thereby shift, but since drive surface $b$ of sun roller 12 has a concave arcuate generatrix as described hereinbefore, that is, has a concave, arcuate cross-sectional profile, the contact point between sun roller 12 and each ball 14 shifts through a relatively large distance, and, therefore the aforementioned point P of intersection of the line passing through the above mentioned two contact points with the centreline of input shaft 4 shifts through a large distance.

Consequently, the angle of inclination of the virtual axis of gyration of each ball 14 changes, and difference between the speeds of gyration and revolution of each ball 14 at the contact point of ball 14 and differential outer ring 17, that is, the speed of differential outer ring 17, is varied. Thus, by actuating worm 27, the rotational speed of output shaft 6 can be steplessly adjusted.

In order to indicate still more fully the nature and utility of the invention, the following analytical consideration is presented.

Referring to FIGS. 3 and 4, each planet ball 14 is in contact with sun roller 11 at a contact point A, with sun roller 12 at a contact point B, with first outer ring 16 at a contact point C, and with differential outer ring 17 at a contact point D. Then, as described hereinbefore, the virtual gyration axis of planet ball 14 lies in a line joining the centre of ball 14 and a point P of intersection with the centreline of input shaft 4 of the extension of a line joining contact points A and B.

In the state indicated in FIG. 3, since the straight line AB is parallel to the centreline of input shaft 4, the virtual gyration axis of planet ball 14 is also parallel to these two parallel lines. In this state, when the conical drive surfaces of first outer ring 16 and differential outer ring 17 are exactly symmetrical, the straight line CD also becomes parallel to the virtual gyration axis of planet ball 14, and, therefore, the rotation of output shaft 6 become zero even when input shaft 4 is rotating.

When, by rotating ratio varying ring 19 by means of worm 27, first outer ring 16 is moved toward the left as viewed in FIG. 4, planet ball 14 moves along the conical contact surface of differential outer ring 17 in a direction away from the centreline of the device, and sun rollers 11 and 12 are caused by the force of spring 13 to approach each other as indicated in FIG. 4.

Then, the speed-reduction ratio, Rr, which is the ratio of the input and output rotational speeds is given by the following equation $$Rr = \frac{r_5(r_1 r_7 + r_2 r_3)}{r_1(r_5 r_7 - r_2 r_8)}$$

where, as indicated in FIG. 4:

$r_1$ = distance from point A to centreline of device;
$r_2$ = distance from point C to centerline of device;
$r_3$ = distance from point A to virtual gyration axis of planet ball 14;
$r_4$ = distance from point B to centreline of device;
$r_5$ = distance from point D to centreline of device;

$r_6$=distance from point B to virtual gyration axis of planet ball 14;
$r_7$=distance from point C to virtual gyration axis of planet ball 14; and
$r_8$=distance from point D to virtual gyration of planet ball 14.

The numerical value of this speed-change ratio is normally from 16 to an infinitesimal. That is, the output rotational speed is from 1/16 of the input rotational speed to zero. The direction of rotation of the output shaft can be caused, as necessary, to be the same as or the reverse of the rotational direction of the input shaft.

In case of high torque transmission, it follows that each diameter of the planet balls is larger and this causes them to be subject to the centrifugal force. Thus the contact pressures between sun rollers and planet balls are reduced, it leading to poor transmission and serious failure. Therefore use should be made of hollow balls to reduce their weight and reduce the centrifugal force to which they are subjected.

In accordance with one embodiment of the present invention, use is made of hollow planet balls each having a non-uniform mass distribution such that the ball has a single axis of maximum moment of inertia. That is, the mass of each ball per unit area of the spherical shell thereof is the greatest in a region around the seam at which two identical hemispheric halves are joined together to form the ball.

Examples of construction for attaining such a mass distribution are illustrated in FIGS. 5 through 8, in which reference numerals 31 and 31a, 33 and 33a, 34 and 34a, and 35 and 35a designate respective pairs of identical hemispheric halves. In the example shown in FIG. 5, the above mentioned weight distribution is provided by a separate internal ring 32.

Figure 9:
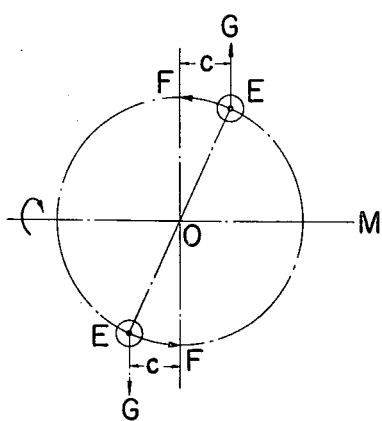
FIG. 9 is an explanatory diagram for a description of the operational behaviour of any of the balls illustrated in FIGS. 5 through 8.

A hollow ball of such construction may be considered to have a single plane of symmetry in which its mass is concentrated. Accordingly when this ball rotates about any arbitrary virtual axis M of gyration, as indicated in FIG. 9, for example, which axis M is not coincident with the centerline perpendicular to the plane of symmetry, centrifugal force may be considered to act at two points E, E with equal magnitudes G, G but in opposite directions, points E, E being in the plane of symmetry in which the seam lies.

Thus, the forces acting on the ball are in equilibrium, but a moment equal to $2 \times c \times G$ due to eccentricity acts on the ball. The ball, therefore, rotates automatically in the direction to reduce this moment and undergoes angular displacement to a stable orientation at which points E, E have been displaced to positions F, F which lie in a plane perpendicular to the axis M of gyration. That is, the hollow planet ball gyrates in a stable state with the plane of its seam perpendicular to its virtual axis of gyration, whereby it is possible to avoid elastic contact or uneven contact at the same part.

Since the seam part of the hollow planet ball according to the invention does not participate in tractive drive, positive and smooth power transmission becomes possible. Accordingly, manufacture of a stepless speed-changing device of planet ball type for high power transmission becomes possible, and, moveover, the performance of the device is remarkedly improved.

Since only a single assembly of planet balls is used in the speed-changing device of the invention, the construction of the device is simple, and, at the same time, the lowering of the efficiency due to the so-called spin effect is small. Furthermore, since the various parts of the device other than the sun roller having a drive surface formed by an arcuate generatrix can be fabricated without difficulty, the device can be produced at low cost.

Since, in the device of the invention, one of the ball-contact surfaces of the two sun rollers clamping therebetween the planet balls is of arcuate profile in section, a difference between the shifts of the contact points between the planet balls and the two sun rollers is produced by moving the first outer ring in the axial direction. Accordingly, the orientations of the virtual axes of gyration of the planet balls are caused to vary, and stepless varying of the speed-change ratio can be accomplished. Moreover, this varying of the speed-change ratio can be readily carried even when the speed-changing device is not operating.

What is claimed is:
1. In a stepless speed-changing device of planet-ball type having input and output shafts, the combination therewith of:
    frame means;
    a single group of a plurality of planet balls lying in a common circular orbit coaxial with the input shaft;
    two sun rollers mounted coaxially on and keyed to a hollow shaft connected to said input shaft and slidable in the axial direction relative to said hollow shaft and relative to each other, and respectively having mutually opposed and beveled outer planet ball contacting surfaces clamping therebetween the planet balls at the radially inner sides thereof, one of said ball contacting surfaces being formed by a concave arcuate generatrix;
    means to apply constant force urging one sun roller toward the other sun roller;
    a first outer ring having a beveled inner planet ball contacting surface and being adjustably movable in the axial direction thereof;
    a differential outer ring having a beveled inner planet ball contacting surface and coupled to the output shaft;
    said beveled inner planet ball contacting surfaces being in mutually opposed disposition and clamping therebetween the planet balls at the radially outer sides thereof;
    said planet balls being caused by rotation of said input shaft to undergo planetary motion with respective virtual axes of gyration; and
    means to move said first outer ring in the axial direction to cause variation of the inclination angle of said virtual axes of gyration of the planet balls relative to the axis of said input shaft and thereby to accomplish stepless variation of the ratio of the rotational speeds respectively of said input and output shafts.

2. A stepless speed-changing device as claimed in claim 1 in which each of said planet balls comprises two hollow hemispheres joined along an annular seam and having a mass distribution such that the mass moment of inertia of the ball about the diametric axis perpendicular to said annular seam is a maximum.

3. A stepless speed-changing device as claimed in claim 1 wherein said means to move said first outer ring consists of a ratio varying ring threadably engageable with said frame means and connected to said first outer ring so that upon rotation said first outer ring is moved in an axial direction whereby the ratio of relative rotational speeds of said input and output shafts may be changed while said device is at standstill.

References Cited
UNITED STATES PATENTS

| | | | |
|---|---|---|---|
| 2,905,026 | 9/1959 | Oehrli | 74—796 |
| 2,913,932 | 11/1959 | Oehrli | 74—796 |
| 3,035,460 | 5/1962 | Guichard | 74—796 |
| 3,246,531 | 4/1966 | Kashihara | 74—796 X |
| 3,293,945 | 12/1966 | Stockton | 74—796 X |

ARTHUR T. McKEON, Primary Examiner